United States Patent [19]

Johnson

[11] 4,163,833

[45] Aug. 7, 1979

[54] METHOD FOR MAKING AROMATIC CYCLIC POLYFORMAL

[75] Inventor: Donald S. Johnson, Scotia, N.Y.

[73] Assignee: General Electric Company, Schenectady, N.Y.

[21] Appl. No.: 905,635

[22] Filed: May 15, 1978

[51] Int. Cl.$^2$ .............................................. C08G 65/40
[52] U.S. Cl. .................................. 528/205; 528/126; 528/128; 528/174; 528/219
[58] Field of Search ............................ 260/61, 47, 49; 528/126, 128, 174, 219, 205

[56] References Cited

U.S. PATENT DOCUMENTS 3,069,386  12/1962  Barclay, Jr. .......................... 260/49

*Primary Examiner*—Lester L. Lee
*Attorney, Agent, or Firm*—William A. Teoli; Joseph T. Cohen; Charles T. Watts

[57] ABSTRACT

There is provided, a method for making cyclic poly-formal substantially free of linear polyformal by agitating a plural phase mixture of an aqueous alkali metal salt solution of bisphenol in contact with methylene halide and a phase transfer catalyst. The cyclic polyformal can be used to make wire coating compositions.

5 Claims, No Drawings

METHOD FOR MAKING AROMATIC CYCLIC POLYFORMAL

BACKGROUND OF THE INVENTION

The present invention relates to a method for making cyclic polyformal by effecting reaction between a bisphenol and a methylene halide in the presence of an alkali metal hydroxide. More particularly, the present invention relates to the use of a phase transfer catalyst to effect contact between a bisphenol dianion in an aqueous phase of a plural phase reaction mixture with a methylene halide, resulting in the production of cyclic polyformal while substantially excluding the formation of linear polyformal.

Prior to the present invention, aromatic polyformal, consisting essentially of chemically combined units of the formula,

—OROCH$_2$—, where R is a divalent aromatic radical, was made by effecting reaction between a diphenylate preform and a methylene halide, as shown by Barclay U.S. Pat. No. 3,069,388. An in situ method for making aromatic polyformal is shown in copending application of Allan S. Hay, Ser. No. 739,562, filed Nov. 8, 1976 and Ser. No. 889,393, filed Mar. 23, 1978, which is a continuation-in-part of Ser. No. 739,562, where both applications are assigned to the same assignee as the present invention. As taught by Hay, Ser. No. 889,393, the aromatic polyformal can contain at least 50% by weight of aromatic cyclic polyformal.

In copending application Ser. No. 905,637, of Allen S. Hay, for Cyclic Polyformals and Method For Making, filed concurrently herewith, based on the use of 1,1-dichloro-2,2-(4-hydroxyphenyl)ethylene, is described which can be used in making wire coating formulations and flame retardants when blended with various organic polymers. Improved yields of aromatic cyclic polyformal is described in the copending application Ser. No. 905,636 of Williams et al, Method for Making Aromatic Cyclic Polyformals, filed concurrently herewith. In Ser. No. 905,636, reaction is effected between a bisphenol dianion and a methylene halide and the resulting aromatic polyformal is extracted with a dialkyl ketone to recover aromatic polyformal cyclics. It would be desirable to provide a method for making aromatic cyclic polyformal of the formula,

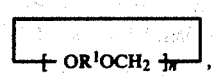 (1)

where R$^1$ is defined more particularly below and n is an integer equal to 2–25 inclusive, which substantially excludes the formation of linear aromatic polyformal which must be separated therefrom.

STATEMENT OF THE INVENTION

The present invention is based on the discovery that if a bisphenol having the formula,

HO—R$^1$—OH, (2)

where R$^1$ is selected from C$_{(6-25)}$ divalent aromatic organic radicals and —R$^2$QR$^2$, R$^2$ is selected from C$_{(6-13)}$ divalent aromatic organic radicals, Q is selected from cyclohexyl, fluorenyl,

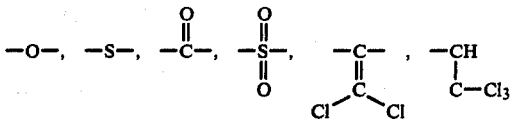

and —C$_y$H$_{2y}$—, and y is equal to 1 to 5 inclusive, is contacted as a dianion in the aqueous phase of a plural phase reaction mixture with a methylene halide in the presence of a phase transfer catalyst, where the concentration of the bisphenol dianion does not exceed about 3% by weight of the aqueous phase, aromatic cyclic polyformal is formed almost exclusively.

There is provided by the present invention, a method for making aromatic cyclic polyformal which comprises (A) refluxing a plural phase mixture comprising
  (a) a bisphenol of formula (2),
  (b) alkali metal hydroxide,
  (c) water,
  (d) methylene halide and
  (e) a phase transfer catalyst,
wherein the plural phase mixture, the concentration of bisphenol does not exceed 3% by weight of the aqueous phase, there is utilized per mole of bisphenol, more than 2 moles of alkali metal hydroxide and more than 1 mole of methylene halide, and there is present by volume at least 0.5 part of organic phase, per part of aqueous phase, (B) recovering aromatic cyclic polyformal from the mixture of (A).

Radicals included by R$^1$ of formulas 1 and 2 are C$_{(6-25)}$ divalent aromatic radicals, for example, phenylene, tolylene, xylylene, naphthalene, etc.; halogenated derivatives of such divalent aromatic hydrocarbon radicals, such as chlorophenylene, bromotolylene, etc., divalent radicals, such as —R$^2$QR$^2$, where R$^2$ is selected from R$^1$ radicals as previously defined.

Included by the bisphenols of formula (2) which can be used in the practice of the present invention to make the aromatic polyformals are, for example,
2,2-bis(4-hydroxyphenyl)propane (bisphenol-A);
2,2'-dihydroxydiphenylmethane;
bis(4-hydroxyphenyl)methane;
1,1-bis-(4-hydroxyphenyl)ethane;
1,1-bis-(4-hydroxyphenyl)propane;
2,2-bis-(4-hydroxyphenyl)pentane;
3,3-bis-(4-hydroxyphenyl)pentane;
4,4'-dihydroxybiphenyl;
4,4'-dihydroxy-3,3',5,5'-tetramethylbiphenyl;
2,4'-dihydroxybenzophenone;
4,4'-dihydroxydiphenylsulfone;
2,4'-dihydroxydiphenyl sulfide;
hydroquinone;
resorcinol;
3,3'-bis(4-hydroxyphenyl)-fluorene;
3,4'-dihydroxydiphenylmethane;
4,4'-dihydroxybenzophenone;
4,4'-dihydroxydiphenylether;
2,2'-(4-hydroxyphenyl)-1,1-dichloroethylene;
2,2-bis(4-hydroxy-3-methylphenyl)propane;
2,2-bis(4-hydroxy-3,5-dimethylphenyl)propane;
1,1-bis(4-hydroxyphenyl)cyclohexane;
1,1-bis(4-hydroxy-3,5-dimethylphenyl)cyclohexane;
1,1-bis(4-hydroxy-3-methylphenyl)cyclohexane;

bis(4-hydroxy-3,5-dimethylphenyl)sulfone;
5-chloro-2,5'-dihydroxydiphenylsulfone;
4,4'-dihydroxydiphenyl ether;
4,4'-dihydroxy-2,5'-dimethyldiphenyl ether, etc.

In the practice of the invention, a mixture of the bisphenol, water, alkali metal hydroxide, methylene halide and phase transfer catalyst is stirred and brought to reflux. Reaction can be effected in the range of from about 40° C. to 100° C. and preferably at reflux.

Suitable methylene halides which can be used in the practice of the invention are, for example, methylene chloride, methylene bromide, chlorobromomethane, etc. Alkali metal hydroxides which can be used in the practice of the method of the present invention are, for example, potassium hydroxide, which can be in the form of pellet, etc., sodium hydroxide, etc. Suitable phase transfer catalysts are, for example, quaternary ammonium and phosphonium salts, as described in JACS, 93 195 (1971) by C. M. Starks. A portion of from about 0.01 to 0.5 mole of phase transfer catalyst per mole of the bisphenol has been found to provide for effective results and preferably from 0.02 to 0.10 mole of phase transfer catalyst per mole of bisphenol.

It has been found that a reaction time from 10 to 60 hours will provide for effective results and preferably from 10 to 25 hours. At the termination of the reaction, the mixture can be allowed to cool to room temperature resulting in the formation of 2 layers. The methylene halide layer can be removed by standard procedures and dried employing a suitable drying agent, for example, anhydrous magnesium sulfate, etc.

If desired, an inert organic solvent can be used in combination with the methylene halide in instances where a larger volume of organic solvent is desired. Suitable inert organic solvents are, for example, monochlorobenzene, toluene, xylylene, etc. Separation of the aromatic cyclic polyformal from the organic layer can be facilitated by evaporating the organic layer by such techniques as passing an inert gas over the surface of the organic layer, distillation of the organic layer, etc.

It has been found that generally the cyclic dimer of the aromatic polyformal can be recovered in substantially pure form, particularly when the bisphenol-A is utilized as a source of the dianion. In such instances, the cyclic dimer separates initially in high yield from the organic phase as the concentration of the aromatic cyclic polyformal exceeds the saturation point. Additional cyclics, such as the corresponding tetramer, also has been found to readily separate following the dimer.

In order that those skilled in the art will be better able to practice the invention, the following examples are given by way of illustration and not by way of limitation. All parts are by weight.

EXAMPLE 1

A mixture of 4 parts of bisphenol-A, 100 parts of 50% sodium hydroxide pellets, 100 parts of water, 2 parts of Aliquat 336 and 266 parts of methylene chloride were stirred and gradually brought to reflux. The mixture was stirred and refluxed for 23 hours and then allowed to cool to room temperature. The mixture was found to separate into 2 layers and the methylene chloride layer was removed by decantation and dried over over anhydrous magnesium sulfate. A liquid chromatography trace was obtained from the dried solution which showed the following composition in terms of aromatic cyclic polyformal of bisphenol-A.

| Methylene Chloride Solution of Bisphenol-A Cyclic Polyformal | |
|---|---|
| Cyclic | WT % |
| C-2 | 30.2 |
| C-3 | 26.5 |
| C-4 | 14.3 |
| C-5 | 8.1 |
| C-6 | 5.4 |
| C-7 | 3.9 |
| C-8 | 2.8 |
| C-9 | 2.2 |
| C-10 | 1.7 |
| C-11 | 1.1 |
| C-12 | 1.0 |
| C-13 | 0.8 |
| C-14 | 0.6 |
| C-15 | 0.5 |
| C-16 | 0.4 |
| C-17 | 0.3 |
| C-18 | 0.1 |
| C-19 | 0.1 |
| C-20 | 0.1 |

Methylene chloride evaporation was then effected with nitrogen gas to increase the concentration of solids in the above solution. A precipitate formed which was recovered by filtering the mixture. There was obtained 0.5 part of product after the precipitate was dried having a melting point from 279°–280° C. Based on method of preparation and a liquid chromatograph, the product was the cyclic dimer of bisphenol-A having the formula,

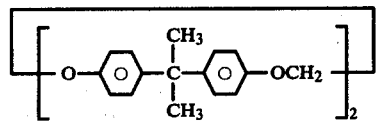

The remaining methylene chloride solution was added to methanol to effect the precipitation of product which was found to have a weight of 2.38 parts upon drying. The product was a mixture of cyclic trimer, tetramer and pentamer of bisphenol-A and a minor amount of C-6 to C-20 cyclics, based on a liquid chromatography trace.

There was added a diethylether-BF$_3$ complex to a concentrated methylene chloride solution of the above polyformal dimer to produce a 1% by weight complex solution. The mixture was stirred with a metal spatula. A solvent resistant coating was found on the metal spatula after it was removed from the mixture and allowed to air dry. A cross-linking of the dimer had occurred which was confirmed by NMR.

EXAMPLE 2

There was added to 4 parts of 1,1-dichloro-2,2-(4-hydroxyphenyl)ethylene, 100 parts of 50% sodium hydroxide pellets, 100 parts of water, 133 parts of methylene chloride, 2 parts of Aliquat 336, a phase transfer catalyst manufactured by the General Mills Company Chemical Division (5% active monomethyltricapryl ammonium chloride) and about 100 parts of chlorobenzene. The resulting mixture is stirred and refluxed for 23 hours. The reaction mixture is then allowed to cool to room temperature and it separates into 2 layers. The organic layer is recovered and dried over magnesium sulfate. Nitrogen is passed over the resulting organic solvent solution until the volume of the mixture is reduced to about ⅛ of its original volume. A significant amount of product separates from the mixture. Based on method of preparation, the product is an aromatic cyclic polyformal of the formula,

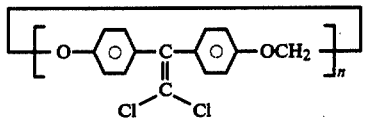

where n is an integer having a value of from 2-25 inclusive.

Although the above examples are directed to only a few of the very many variables which can be used in the practice of the method of the present invention, it should be understood that the method of the present invention is directed to a much broader class of bisphenols of formula (2), resulting in a much broader variety of cyclic polyformal shown within formula (1).

What I claim as new and desire to secure by Letters Patent of the United States is:

1. A method for making aromatic cyclic polyformal which comprises
  (A) refluxing a plural phase mixture comprising
    (a) a bisphenol of the formula,

(b) alkali metal hydroxide,
    (c) water,
    (d) methylene halide and
    (e) a phase transfer catalyst,
  where in the plural phase mixture, the concentration of bisphenol does not exceed 3% by weight of the aqueous phase, there is utilized per mole of the bisphenol, more than 2 moles of alkali metal hydroxide and more than 1 mole of methylene halide, and there is present by volume at least 0.5 part of organic phase, per part of aqueous phase,
  (B) recovering aromatic cyclic polyformal from the mixture of (A), by effecting the separation of the aromatic cyclic polyformal by the use of methanol or by effecting the evaporation of organic solvent therefrom,
where R is selected from $C_{(6-25)}$ divalent aromatic radicals.

2. A method in accordance with claim 1, where the bisphenol is 2,2-bis(4-hydroxyphenyl)ethylene.

3. A method in accordance with claim 1, where the methylene halide is methylene chloride.

4. A method in accordance with claim 1, where the alkali metal hydroxide is sodium hydroxide.

5. A method in accordance with claim 1, where the bisphenol is 1,1-dichloro-2,2-(4-hydroxyphenyl)ethylene.

* * * * *